(No Model.)  2 Sheets—Sheet 1.
J. E. MORRIS.
PLANTER.
No. 327,960.  Patented Oct. 6, 1885.
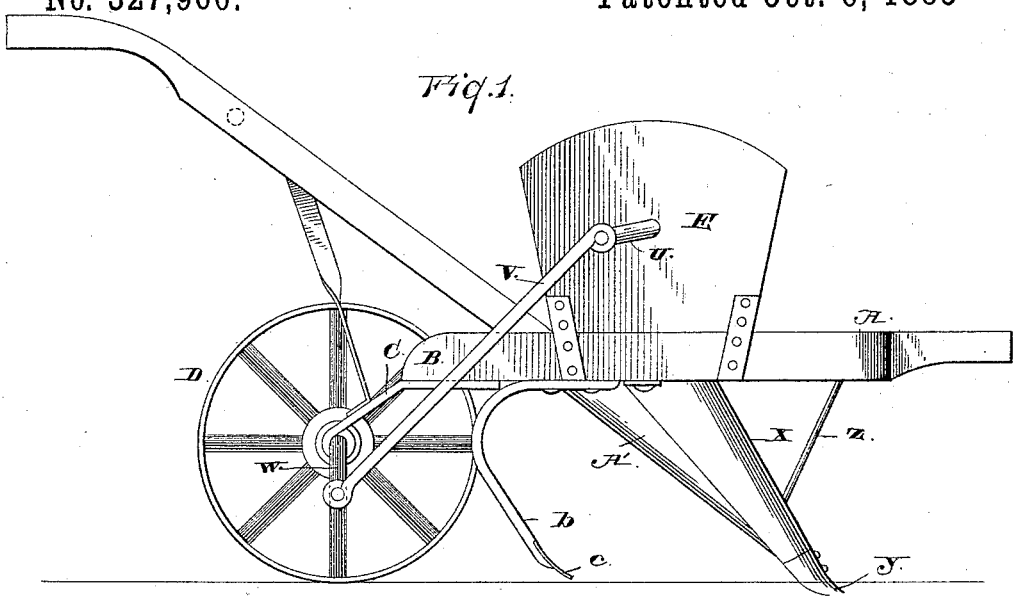
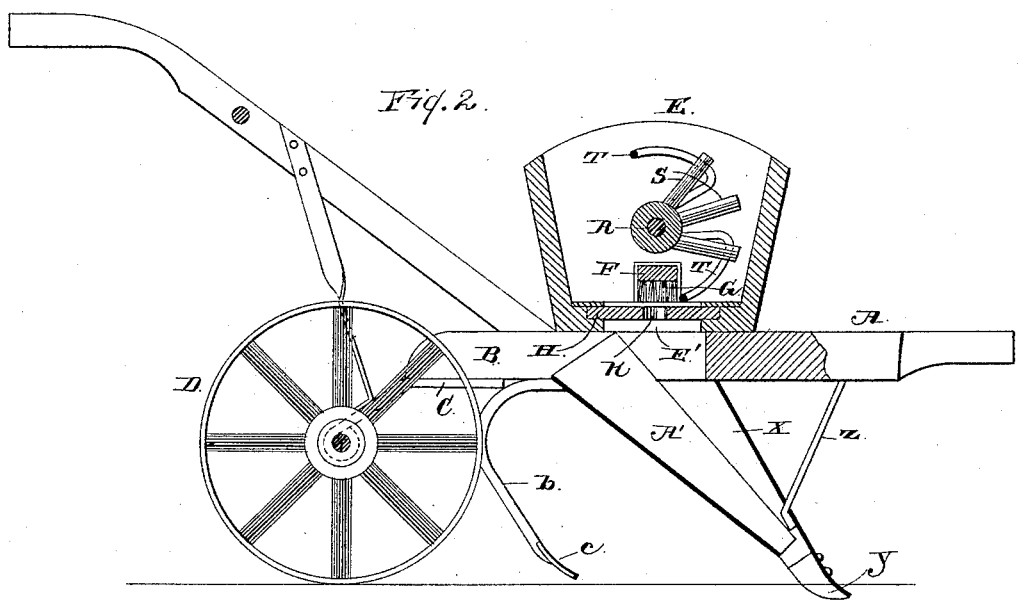
WITNESSES
M. E. Fowler
J. W. Garner
INVENTOR
J. E. Morris
By Crowley
his Attorneys (No Model.) J. E. MORRIS. 2 Sheets—Sheet 2.
PLANTER.
No. 327,960. Patented Oct. 6, 1885.
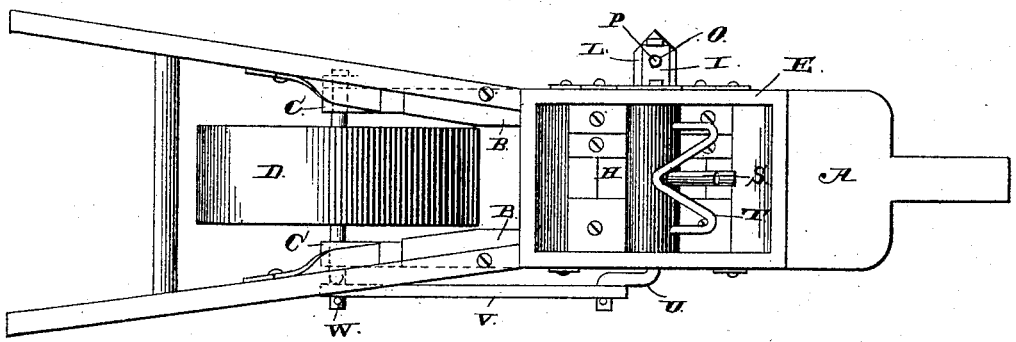
Fig. 3.
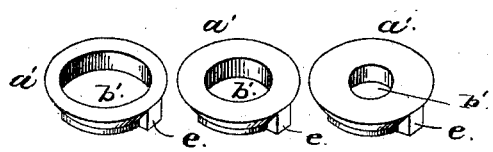
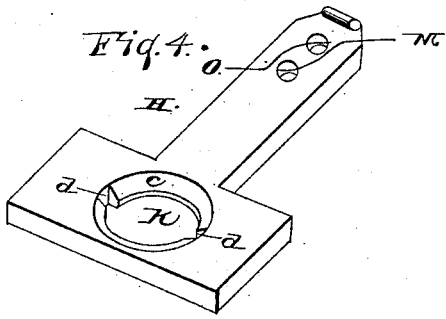
Fig. 4.
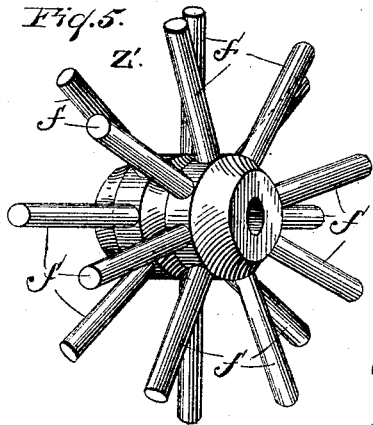
Fig. 5.
WITNESSES
M. E. Fowler
J. W. Garner
INVENTOR
J. E. Morris
By C. A. Snow & Co.
his Attorneys

UNITED STATES PATENT OFFICE.

JOHN EDWIN MORRIS, OF SAN MARCOS, TEXAS.

PLANTER.

SPECIFICATION forming part of Letters Patent No 327,960, dated October 6, 1885.

Application filed July 30, 1885. Serial No. 173,050. (No model.)

*To all whom it may concern:*

Be it known that I, JOHN E. MORRIS, a citizen of the United States, residing at San Marcos, in the county of Hays and State of Texas, have invented a new and useful Improvement in Planters, of which the following is a specification, reference being had to the accompanying drawings.

My invention relates to an improvement in planters; and it consists in the peculiar construction and combination of devices, that will be more fully set forth hereinafter, and particularly pointed out in the claims.

In the accompanying drawings, Figure 1 is a side elevation of a planter embodying my invention. Fig. 2 is a vertical central sectional view of the same. Fig. 3 is a top plan view. Figs. 4 and 5 are detailed views.

A represents the frame of the planter, which consists of the beams B, to the rear ends of which are bolted the brackets C, in which brackets is journaled a wheel, D, having a broad tread or rim.

E represents a hopper, which is bolted on the upper sides of the beams B at the center thereof, and the lower end of this hopper is provided with a slotted opening, E'.

Across the bottom of the hopper extends a bar, F, which is provided at its center, on its under side, with a brush, G, which registers with a slotted opening in the bottom of the hopper.

H represents a slide, which is located in the bottom of the hopper, is provided with a side extending arm, I, which extends out from one side of the hopper, and has near its inner edge a circular opening, K, of corresponding diameter to the width of the slotted opening in the bottom of the hopper.

A bracket, L, is secured to the outer side of the hopper, below the outer end of the arm I, and this bracket is provided with an opening which registers with opening M O, alternately, as the slide is drawn in or out. When the slide is pushed in, the opening O registers with the opening in the bracket, and is secured thereto by a pin, P. When the slide is in this position the slotted opening in the bottom of the hopper is closed, and the opening K in the slide registers with the opening in the hopper, to provide for the exit of the seeds that are to be planted in hills. When so arranged the planter is adapted for planting corn or beans.

R represents a horizontal shaft, which is journaled in the sides of the hopper, and is provided with radial stirring-arms S at its center. In addition to the arms S the shaft is provided with V-shaped bent arms T, the points of which are in line with the stirring-arms S. A crank, U, is fixed to one end of the shaft R, and is connected by means of a rod, V, with a similar crank, W, with which the shaft of the wheel D is provided. As the wheel rotates the shaft R is rocked in the hopper. The stirring-arms S loosen the grain in the hopper, and cause it to descend to the bottom thereof, and the points of the V-shaped arms T force the grain under the brush in the bottom of the hopper, and cause it to drop through the opening in the bottom of the hopper and into the ground.

X represents a furrow-opener, which is bolted to the under side of the frame, below the opening in the bottom of the hopper. This furrow-opener is semicircular in cross-section, and is provided at its lower end with a point, Y, which is detachably attached thereto by means of bolts. A brace-rod, Z, connects the front side of the furrow-opener with the frame. The furrow-opener forms the front side of a grain-conveyer, the rear side of which is formed by the semicircular bent sheet-metal spout A'. The seeds as they drop from the hopper fall into the seed spout or conveyer, and are conveyed to the ground.

Near the rear ends of the beams B are bolted standards b, to the lower end of which are bolted the detachable feet or teeth c, which serve as stirrers or coverers for the seeds. The broad tread of the wheel D, which works in rear of the seed-spout, serves as a roller for covering the seeds after they have been deposited in the ground.

When the slide in the bottom of the hopper is drawn out, so as to open the slotted opening E, the planter is adapted for use in planting cotton.

In Fig. 4 the seed-slide H is illustrated in detail. The opening K in this slide is sufficiently large for the passage of a number of seeds simultaneously. In order to reduce this opening to any desired size, so as to plant more or fewer seeds in each hill, as preferred, I employ a number of interchangeable dies, $a'$, which are adapted to fit in the opening K, and are provided with openings $b'$ of varying sizes. The opening K has shouldered walls $c$, and on opposite sides is provided with notches $d$. The dies are each shouldered around the circumference to fit in the shouldered recess, and are provided with extending projections $e$, that fit in the notches $d$, and secure the die in the opening $k$, the face of the die being flush with the seed-slide.

In black mucky soil the roller-wheel D cannot be employed to advantage, and in this case I dispense with said wheel, and employ in its stead a walking-wheel, $Z'$, having two sets of spokes, $f$, located near the ends of the hub. These spokes work on opposite sides of the lines of seeds planted, so as to prevent the spokes from coming in contact with the seeds, and thus either forcing them out of the ground, or, when a spoke strikes fairly on a seed, forcing it deeply in the ground, where it cannot sprout.

A planter thus constructed is exceedingly cheap and simple, is positive and direct in its action, and is not likely to get out of order.

Having thus described my invention, I claim—

1. The combination of the frame, the hopper having the slotted opening E' in its bottom, the rock-shaft journaled in the hopper, said rock-shaft being provided with the radial stirrers S and V-shaped bent extending arms T, substantially as described.

2. The combination of the frame, the hopper having the slotted opening E' in its bottom, the slide H, located below the bottom of the hopper, having the opening K, and the rock-shaft R, journaled in the hopper, said rock-shaft being provided with the radial stirrers S and V-shaped bent extending arms T, substantially as described.

3. The combination of the frame, the hopper provided with the slotted opening E' in its bottom, the bar F, having the brush G, which registers with the slotted opening, the slide H, located under the bottom of the hopper, and provided with the opening K, and the rock-shaft R, journaled in the hopper, said rock-shaft being provided with the radial stirrers S and the bent V-shaped extending arms T, substantially as described.

In testimony that I claim the foregoing as my own I have hereto affixed my signature in presence of two witnesses.

JOHN EDWIN MORRIS.

Witnesses:
   T. REASONER,
   JAS. K. STUART.